(12) United States Patent
Amanullah et al.

(10) Patent No.: US 11,124,687 B2
(45) Date of Patent: Sep. 21, 2021

(54) SYNTHESIZED LUBRICANTS FOR WATER-BASED DRILLING FLUID SYSTEMS

(71) Applicant: Saudi Arabian Oil Company, Dhahran (SA)

(72) Inventors: Md Amanullah, Dhahran (SA); Jothibasu Ramasamy, Dhahran (SA); Ali Radhwan, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 71 days.

(21) Appl. No.: 16/037,569

(22) Filed: Jul. 17, 2018

(65) Prior Publication Data

US 2020/0024499 A1 Jan. 23, 2020

(51) Int. Cl.
  *C09K 8/035* (2006.01)
  *C09K 8/20* (2006.01)

(52) U.S. Cl.
  CPC ............ *C09K 8/206* (2013.01); *C09K 8/035* (2013.01); *C09K 2208/34* (2013.01)

(58) Field of Classification Search
  CPC ............... C09K 2208/28; C09K 2208/34; C09K 8/035; C09K 8/206; C09K 8/22
  See application file for complete search history.

(56) References Cited

U.S. PATENT DOCUMENTS

| | | | |
|---|---|---|---|
| 2,383,632 A | 8/1945 | Trent | |
| 3,048,538 A | 8/1962 | Rosenberg et al. | |
| 4,371,470 A | 2/1983 | Matsukura et al. | |
| 4,802,998 A * | 2/1989 | Mueller | C09K 8/06 507/134 |
| 5,888,947 A | 3/1999 | Lambert et al. | |
| 8,563,482 B2 | 10/2013 | Amanullah | |
| 8,846,583 B2 | 9/2014 | Espange et al. | |
| 9,546,342 B1 | 1/2017 | Sutterlin et al. | |
| 9,598,625 B2 | 3/2017 | Massey et al. | |
| 2009/0293665 A1 | 12/2009 | Brouwer et al. | |
| 2013/0236520 A1 | 9/2013 | Popovsky et al. | |
| 2015/0144403 A1 | 5/2015 | Forest et al. | |
| 2015/0166866 A1* | 6/2015 | Dobson, Jr. | C09K 8/08 175/65 |
| 2015/0322325 A1* | 11/2015 | Amanullah | C09K 8/16 175/65 |
| 2017/0137689 A1 | 5/2017 | Deroo | |

FOREIGN PATENT DOCUMENTS

| | | |
|---|---|---|
| CN | 102311722 A | 1/2012 |
| CN | 104371674 A | 2/2015 |
| WO | 2008006065 A1 | 1/2008 |
| WO | 2013078374 A1 | 5/2013 |
| WO | 2015085306 A1 | 6/2015 |
| WO | 2015171700 A1 | 11/2015 |
| WO | 2016183140 A1 | 11/2016 |
| WO | 2017176244 A1 | 10/2017 |

OTHER PUBLICATIONS

Magee et al, Composition of American Distilled Tall Oils, JAOCS, vol. 64, 4, pp. 321-324, 1992 (Year: 1992).*
Karmakar et al., "Chemically Modifying Vegetable Oils to Prepare", Lubricants, 5, 44, pp. 2-17, Nov. 7, 2017.
Lam et al., "Homogeneous, heterogeneous and enzymatic catalysis for transeterification of high free fatty acid oil (waste cooking oil) to biodiesel: A review", Biotechnology Advances 28, pp. 500-518, Mar. 31, 2010.
International Search Report and Written Opinion dated Feb. 21, 2019 pertaining to International application No. PCT/US2018/050858 filed Sep. 13, 2018, 13 pgs.
International Search Report and Written Opinion dated Mar. 8, 2019 pertaining to International application No. PCT/US2018/050860 filed Sep. 13, 2018, 34 pgs.
First Examination Report pertaining to Patent Application No. GC2018/36119, 4 pages, dated Feb. 12, 2020.
First Examination Report pertaining to Patent Application No. GC2018/36118, dated Feb. 11, 2020.
Miswaco, et al., ROP-Enhancing Primary Lubricant, www.miswaco.com/HydraGlyde, 1 page.
U.S. Office Action dated Feb. 9, 2021 pertaining to U.S. Appl. No. 16/037,593, filed Jul. 17, 2018, 12 pgs.
Office Action dated Oct. 21, 2020 pertaining to U.S. Appl. No. 16/037,593, filed Jul. 17, 2018, 30 pgs.
U.S. Office Action dated Aug. 6, 2021 pertaining to U.S. Appl. No. 16/037,593, filed Jul. 17, 2018, 13 pages.

* cited by examiner

*Primary Examiner* — Alicia Bland
(74) *Attorney, Agent, or Firm* — Dinsmore & Shohl LLP

(57) ABSTRACT

The present application discloses water-based drilling fluid systems and methods of making water-based drilling fluids systems. According to one embodiment, a drilling fluid system may include a drilling fluid and a lubricant. The lubricant may be synthesized from waste vegetable oil.

13 Claims, No Drawings

SYNTHESIZED LUBRICANTS FOR WATER-BASED DRILLING FLUID SYSTEMS

TECHNICAL FIELD

Embodiments of the present disclosure generally relate to materials and methods utilized in natural resource wells and, more specifically, to water-based drilling fluids for use in drilling operations.

BACKGROUND

Drilling operations, for example, drilling a new wellbore for hydrocarbon extraction, include the common practice of continuously circulating a drilling fluid (alternatively known as a drilling mud) through the wellbore during the operation. The drilling fluid is pumped into the drill pipe to the bottom of the borehole, where the drilling fluid then flows upwardly through an annular space between the wellbore wall and the drill pipe and finally returns to the surface and flows out of the wellbore, where it is recovered for secondary processing. During drilling, the drilling solids, such as portions of the drilled geological formation, may be carried by the drilling fluid from at or near the bottom of the wellbore to the surface. After its return to the surface, the drilling fluid may be mechanically or chemically treated to remove captured solids and drill cuttings from the drilling fluid before recirculation back through the wellbore.

SUMMARY

Drilling fluids are used in various drilling applications, such as rotary drilling and coiled tubing drilling applications, to complete functional tasks and ensure that the drilling operation is safe, trouble-free, and economical. One objective of a drilling fluid is the reduction of friction between the drill string and the casing or the borehole wall by acting as a lubricating medium between the metal-metal interface and the metal-mudcake interface while drilling.

Conventional water-based drilling fluids, or "muds," have poor lubricating properties and thus have much higher coefficient of friction (COF) compared to oil-based drilling fluid systems. This is one of the major technical limitations of water-based drilling fluid systems compared to oil-based drilling fluid systems.

Different types of lubricating additives are added in water-based drilling fluid systems to reduce the COF and mitigate the torque and drag problems encountered in horizontal or extended-reach well drilling applications. A horizontal well is a high-angle well with an inclination of generally greater than 85° from true vertical. Horizontal wells are drilled to enhance reservoir performance by placing a long wellbore section within the reservoir. An extended-reach well is one in which the ratio of the measured depth versus the true vertical depth is at least 2:1.

In case of horizontal- and extended-reach wells, a high COF can cause a reduction in drilling efficiency, an increase in equipment wear and pipe twist-off, a reduction in the rate of penetration, and an increase in the torque and drag, which can lead to various other drilling problems. A high COF can also limit the reach of horizontal and extended-reach wells, causing a potential barrier for extended-reach drilling operations. Therefore, drilling fluids with lesser COF values are desirable for horizontal and extended reach drilling operations.

To minimize the frictional resistance or COF values of water-based drilling fluids, lubricating additives are often incorporated in the drilling fluid systems. However, many of these materials have limitations in their applications. Some of the conventional lubricants have limited capacity to reduce the COF of drilling fluid to enhance the fluid performance. Some of the lubricating materials lack the requisite thermal and chemical stability. Some of these conventional lubricating materials are poorly biodegradable, highly toxic, and not eco-friendly. Therefore, these materials have restricted applications for ecologically sensitive environments.

As such, there are ongoing needs for water-based drilling fluid systems with lubricating additives that reduce the COF while minimizing negative impact to the surrounding environment. Embodiments of the present disclosure include water-based drilling fluid systems that include a synthesized lubricant, which includes plant-based fatty acids and a plant-based alkyl ester. The disclosed water-based drilling fluid systems with the synthesized lubricant have improved lubrication properties and environmentally-friendly qualities when compared to water-based drilling fluids without lubricants and water-based drilling fluid systems using conventional lubricants.

According to one or more embodiments, a water-based drilling fluid system is disclosed, which includes a water-based drilling fluid and a synthesized lubricant. The synthesized lubricant includes a plant-based alkyl ester and a plant-based free fatty acid. In further embodiments, the synthesized lubricant comprises more plant-based alkyl ester than plant-based free fatty acid.

According to one or more embodiments, a method of producing a water-based wellbore drilling fluid system is also disclosed. The method includes mixing a plant-based alkyl ester and a plant-based free fatty acid to produce a synthesized lubricant and mixing the synthesized lubricant with a water-based drilling fluid to form the water-based wellbore drilling fluid system. In further embodiments, the synthesized lubricant comprises more plant-based alkyl ester than plant-based free fatty acid.

Additional features and advantages of the described embodiments will be set forth in the detailed description which follows, and in part will be readily apparent to those skilled in the art from that description or recognized by practicing the described embodiments, including the detailed description which follows and the claims.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will convey the scope of the subject matter to those skilled in the art.

Embodiments of the present disclosure are directed to synthesized lubricants for water-based drilling fluids and, additionally, to water-based drilling fluid systems incorporating the disclosed synthesized lubricants. The water-based drilling fluid system is a combination of a base drilling fluid and a synthesized lubricant that includes plant-based fatty acids and plant-based alkyl esters Reference will now be made, in detail, to embodiments of synthesized lubricants. Embodiments of the water-based drilling fluid system include plant-based alkyl esters, which may be derived from a plant-based raw material oil. In some embodiments, the alkyl ester may include any short chain alkyl group including methyl esters, ethyl esters, propyl esters, or isopropyl esters. In further embodiments, the plant-based alkyl ester may be a methyl ester. The alkyl esters that may be produced through the disclosed methods may include derivatives of saturated free fatty acids, mono-unsaturated free fatty acids, and polyunsaturated free fatty acids. A saturated fatty acid may include palmitic acid ($C_{16}$). The saturated fatty acid may also include stearic acid ($C_{18}$) and arachidic acid ($C_{20}$). A mono-unsaturated fatty acid may include oleic acid ($C_{18}$). A polyunsaturated fatty acid may include linoleic acid ($C_{18}$).

Plant-based raw material oils include vegetable oil. Vegetable oil is a triglyceride extracted from a plant and seeds. Triglyceride is an ester of glycerol and three free fatty acids. Depending on the source of plants or seeds used to produce the vegetable oil, a vegetable oil may contain a mixture of different types of free fatty acids such as saturated, mono unsaturated, poly unsaturated, omega 3, omega 6 or omega 9 free fatty acids. Vegetable oils are commonly used in food preparation. Commonly used vegetable oils that may be used in food preparation include, but are not limited to, olive oil, palm oil, sunflower oil, corn oil and peanut oil. A vegetable oil may be "fresh" or "waste." Fresh vegetable oils, which may also be referred to as "pure vegetable oils," have not been processed or used in food preparation.

"Waste" vegetable oils, which may also be referred to as "used" vegetable oils, include fresh vegetable oils that have been processed in some way or used in food preparation. Sometimes, waste vegetable oils may also be referred to as "recycled" vegetable oil when the waste vegetable oil is then further processed or used in some way.

Waste vegetable oils may be used as a sustainable, inexpensive plant-based raw material oil for applications requiring vegetable oil. Waste vegetable oils may be used as emulsifiers and lubricants. In some embodiments of the present disclosure, waste vegetable oil is used as a plant-based raw material oil to derive the plant-based alkyl esters comprised in synthesized lubricants. Therefore, plant-based alkyl esters derived from waste vegetable oils may be used to produce synthesized lubricants for use in water-based drilling fluid systems. When used in this way, the water-based drilling fluid system that includes the synthesized lubricant may have a reduced COF when compared to conventional water-based drilling fluid systems. At the same time, the water-based drilling fluid system that includes the synthesized lubricant may also be environmentally-friendly.

Embodiments of the water-based drilling fluid system also include plant-based free fatty acids, which may be derived from a tall oil. Tall oil, which is alternatively known as "liquid rosin" or "tallol," is a by-product of the Kraft process of wood pulp manufacture. In one or more embodiments, the plant-based free fatty acid from tall oil may include a hydrocarbyl group ($R^2$) having from 12 to 18 carbon atoms and may be any other long chain unsaturated carboxylic acid. In some embodiments, the plant-based free fatty acid, which may be derived from tall oil, may include at least one of palmitic acid, oleic acid, linoleic acid, or combinations of these. In some embodiments, the plant-based free fatty acid from tall oil includes a free fatty acid from linoleic acid with chain length of $C_{18}$ and high unsaturation.

Reference will now be made, in detail, to embodiments of producing synthesized lubricants that include plant-based fatty acids and a plant-based alkyl ester.

Embodiments of producing a synthesized lubricant include contacting a plant-based raw material oil with a catalyst to react the triglycerides of the plant-based raw material oil and produce an alkyl ester. In some embodiments, the plant-based raw material oil may be a vegetable oil. In further embodiments, the plant-based raw material oil may specifically be a waste vegetable oil.

In one or more embodiments of deriving the plant-based alkyl ester for use in a synthesized lubricant, a quantity of catalyst may be required to process the raw material oil. The catalyst can include at least one of sodium hydroxide, potassium hydroxide, sodium alkoxide, potassium alkoxide, or combinations thereof. The raw material oil can be esterified with methanol in the presence of sodium hydroxide. The quantity of catalyst may be determined by a titration method. The titration method may include mixing 1 milliliter (mL) of raw material oil with 10 mL of isopropyl alcohol of 99.2% purity by volume. Next, about 2 to about 3 drops of an indicator fluid (phenolphthalein or other indicator fluid) may be added to the mixture. The indicator fluid may then be added drop by drop into agitated raw material oil until the color of the mixture changes to pink, which reveals an endpoint. After this endpoint has been found, the mixture may be stirred to check the permanency of the pink color. The titration test may then be repeated three times to calculate the average amount of catalyst required to reach the endpoint. In some embodiments, from about 4.0 to about 4.5 grams (g) of catalyst per 1 liter (L) of raw material oil may be necessary to derive the alkyl ester. In other embodiments, from about 4.1 to about 4.3 g of catalyst per 1 L of raw material oil may be necessary to derive the plant-based alkyl ester. In other embodiments, from about 4.18 to about 4.22 g of catalyst per 1 L of raw material oil may be necessary to derive the plant-based alkyl ester.

In further embodiments of deriving the plant-based alkyl ester for use in water-based drilling fluid systems, methanol and NaOH may be mixed under dry conditions (meaning without water) using a magnetic stirrer. This mixture may then be added to the raw material oil in a container. The mixture may then be stirred for about 4 to about 8 hours using the magnetic stirrer to complete the interactions. In other embodiments, the mixture may be stirred from about 5 to about 7 hours, or from about 4 to about 6 hours, or from about 6 to about 8 hours, or at about 6 hours. The total reaction product may then be allowed to stay in static conditions for a period of time (overnight) to complete the sedimentation of glycerol and sludge at the bottom of the container.

In some embodiments, during the initial settling phase, some emulsion may form from byproducts in the ester layer. Such an emulsion may be broken by heating the container. In some embodiments, the container may be heated at about 70° C. to about 90° C. or at about 80° C. In other embodiments, the emulsion may be broken up by adding acetic acid to the container. In some embodiments, about 10 mL of acetic acid per 1 liter of raw material oil may be added to break up and prevent the formation of an emulsion. Then, the top clear esterified oil may be slowly decanted and washed for several hours using water while stirring with a magnetic stirrer. The esterified oil and the washed water may be kept under static conditions overnight to allow the oil and water phases to separate. The separated oil phase is then slowly decanted to remove it from the water phase. In some embodiments, this washing step may be repeated multiple times, (twice).

After the washing, the washed, esterified oil is then heated. In some embodiments, the esterfied oil is heated at a temperature of about 70° C. to about 90° C. In other embodiments, the esterfied oil is heated to 80° C. In some embodiments, the esterfied oil is heated under dynamic condition using a hot plate and a magnetic stirrer to further remove water and methanol from the processed vegetable oil resulting in the washed and heated plant-based alkyl ester, which may be substantially free of residual water or short chain alcohol.

In some embodiments of producing the synthesized lubricant, the plant-based free fatty acid may be derived from a tall oil. In some embodiments, the tall oil may be obtained from a commercial source, such as SYLFAT FA1 Tall Oil Fatty Acid from Kraton Corporation.

In some embodiments, the plant-based alkyl ester and the plant-based free fatty acid are mixed so that the synthesized lubricant includes a synthesized lubricant. In some embodiments, the ratio of plant-based alkyl ester to plant-based free fatty acids may be from 1.5:1 to 3:1 by barrel of mud. In other embodiments, the plant-based alkyl ester and the plant-based free fatty acid is present in the synthesized lubricant in a ratio of plant-based alkyl ester to plant-based free fatty acids of about 2:1 to about 3:1 by barrel of mud. In volumetric terms, this ratio could be expressed as from 8:4 to 7:3 (milliliters to milliliters). In one embodiment, the volumetric ratio may be 7.5:3.5 in milliliters.

In some embodiments, the plant-based alkyl ester and a plant-based free fatty acid are mixed to produce a synthesized lubricant at low shear. Low shear mixing, alternatively referred to as "low energy mixing," refers to the general blending of a product without reducing particle size during the mixing process.

In some embodiments, the plant-based alkyl ester and a plant-based free fatty acid are mixed at a temperature from about 40 degrees Celsius (° C.) to about 60° C. In other embodiments, the plant-based alkyl ester and a plant-based free fatty acid are mixed at a temperature of about 40° C. to about 50° C., from about 50° C. to about 56° C. or at about 50° C.

As stated previously, the waste vegetable oil may include vegetable oils that have been used in food preparation; therefore, the waste vegetable oil may include impurities. Such impurities may include burnt and unburned food residue. In some embodiments, the waste vegetable oils may be obtained from the food industry, specifically, from restaurants.

Some embodiments of producing a synthesized lubricant may also include a first filtration step prior to contacting the plant-based raw material oil and the catalyst. In some embodiments where the plant-based raw material oil is a waste vegetable oil, the plant-based raw material oil may be filtered to remove impurities present in the waste vegetable oil. In such embodiments that include a filtration step, a filtration cell may be used to remove the impurities produced la the plant-based raw material oil. In some embodiments, the filtration cell may include size 5 micrometer (μm) filter paper or sizes that are less than 5 μm to remove impurities that are larger than 5 μm. During filtration, a constant pressure may be applied to the filtration cell. About 5 (pounds per square inch (psi) to about 20 psi may be applied to the filtration cell. In other embodiments, about 5 psi to about 10 psi may be applied to the filtration cell. In other embodiments, other filtration media and adsorbents may be used. The other filtration media and absorbents include any filtration media or absorbents that are capable of removing impurities and excess water from the waste vegetable oil. In some embodiments, a multi-cell filtration apparatus may be used to remove impurities and produce the plant-based raw material oil.

Reference will now be made, in detail, to embodiments of producing a water-based drilling fluid system that includes the synthesized lubricants.

As stated above, conventional lubricating materials are used in water-based drilling fluid systems to mitigate the COF values of the water-based drilling fluids. However, because of an increasing number of stringent environmental laws and regulations, these materials can only be used in a limited number of applications. Hence, there are needs in the industry for an environmentally-friendly and high-performance lubricant to enhance the lubrication properties of commonly used water-based drilling fluids.

Embodiments of the water-based drilling fluid system include the synthesized lubricant described previously. In some embodiments, the water-based drilling fluid system includes less than 5 weight percent (wt. %) of the synthesized lubricant based on the total weight of the water-based drilling fluid system. In other embodiments, the water-based drilling oil system includes from about 0.5 wt. % to about 5 wt. % of the synthesized lubricant based on the total weight of the water-based drilling fluid system. In further embodiments, the water-based drilling oil system includes about 1 wt. % to about 5 wt. %, about 2 wt. % to about 5 wt. %, about 3 wt. % to about 5 wt. %, about 2 wt. % to about 4 wt. % or about 3 wt. % of the synthesized lubricant based on the total weight of the water-based drilling fluid system.

In some embodiments, the plant-based alkyl ester and a plant-based free fatty acid are mixed to produce a synthesized lubricant at low shear. In further embodiments, the plant-based alkyl ester and a plant-based free fatty acid are mixed separately from the water-based drilling fluid to produce the synthesized lubricant, which is subsequently mixed with the water-based drilling fluid to produce embodiments of the water-based drilling fluid system.

Additionally, embodiments of the water-based drilling fluid system include a water-based drilling fluid. Embodiments of the water-based drilling fluid may include a non-dispersed drilling fluid, a dispersed drilling fluid, a saltwater drilling fluid, or a polymer drilling fluid. Non-dispersed drilling fluids may include simple gel-and-water drilling fluids, which may typically be used for tophole drilling. A non-dispersed drilling fluid may contain potassium chloride and bentonite. In some embodiments, the water-based drilling fluid may also be a low solid non-dispersion (LSND) drilling fluid. Basic components of a LSND drilling fluid typically include freshwater, a gelling material such as bentonite, caustic soda, soda ash, and flocculants. Dispersed drilling fluids are treated with chemical dispersants that are designed to deflocculate clay particles to allow improved rheology control in higher-density muds. The water-based drilling fluid may include potassium chloride (KCl), sodium chloride ($CaCl_2$), or combinations of these.

The water-based drilling fluid includes water. Water may include one or more of fresh water, filtered water, distilled water, sea water, salt water, produced water, formation brine, synthetic brine, other types of water, or combinations of waters. In one or more embodiments, the water-based drilling fluid includes 70 wt. % to 98 wt. % water based on the total weight of the water-based drilling fluid. In various embodiments, the water-based drilling fluid comprises 70 wt. % to 95 wt. % water, 75 wt. % to 98 wt. % water, 75 wt. % to 95 wt. % water, 80 wt. % to 98 wt. % water, 80 wt. % to 95 wt. % water, 85 wt. % to 98 wt. % water, or 85 wt. % to 95 wt. % water based on the total weight of the water-based drilling fluid.

The water-based drilling fluid system may include at least one solid-phase component. Solid-phase components in the water-based drilling fluid system may include, but are not limited to, the weighting materials, starch, soda ash, bentonite, lime, sodium sulfite, other solid-phase components, or combinations of these solid-phase components. All of the solid-phase components together make up a total solids content of the water-based drilling fluid system. In some embodiments, the water-based drilling fluid system may have a total solids content of less than or equal to 50 wt. % based on the total weight of the water-based drilling fluid composition. Alternatively, in other embodiments, the water-based drilling fluid system may have a solids content of less than or equal to 25 wt. % or less than or equal to 10 wt. % based on the total weight of the water-based drilling fluid system.

The water-based drilling fluid system may optionally include one or a plurality of additives to enhance the properties and characteristics of the water-based drilling fluid system. The additives include, but are not limited to, emulsifiers, fluid-loss control additives, viscosifiers (viscosity control agents), alkali compounds, friction reducers, or combinations of these. The water-based drilling fluid system may also optionally include pH buffers, electrolytes, glycols, glycerols, dispersion aids, corrosion inhibitors, defoamers, and other additives or combinations of additives. In embodiments, the water-based drilling fluid system may optionally include a viscosifier to impart non-Newtonian fluid rheology to the water-based drilling fluid system to facilitate lifting and conveying rock cuttings to the surface of the wellbore. Viscosifiers may include, but are not limited to, xanthan gum polymer (XC polymer), bentonite, polyacrylamide, polyanionic cellulose, or combinations of these viscosifiers. In further embodiments, the water-based drilling fluid system may optionally include a friction reducing material, such as a finely ground altered calcium montmorillonite clay, commonly known as "rev dust." In further embodiments, the water-based drilling fluid system may optionally include sodium asphalt sulfonate, commonly known as "soltex." In other embodiments, the water-based drilling fluid system may include about 0 wt. % to 2 wt. %, 0.5 wt. % to 2 wt. %, 0.5 wt. % to 1.5 wt. %, 0.5 wt. % to 1 wt. %, 1 wt. % to 2 wt. %, 1 wt. % to 1.5 wt. %, or 1.5 wt. % to 2 wt. % of additives.

The water-based drilling fluid system may optionally include at least one pH adjuster. In embodiments, the water-based drilling fluid system may optionally include at least one alkali compound. Alkali compounds may include, but are not limited to, lime (calcium hydroxide or calcium oxide), soda ash (sodium carbonate), sodium hydroxide, potassium hydroxide, other strong base, or combinations of these alkali compounds. The alkali compounds may react with gases, such as $CO_2$ or $H_2S$, encountered by the water-based drilling fluid system during drilling operations to prevent the gases from hydrolyzing components of the water-based drilling fluid composition. In other embodiments, the water-based drilling fluid system may include 0.1 wt. % to 1 wt. %, 0.1 wt. % to 0.8 wt. %, 0.1 wt. % to 0.6 wt. %, 0.1 wt. % to 0.4 wt. %, 0.1 wt. % to 0.2 wt. %, 0.2 wt. % to 1 wt. %, 0.2 wt. % to 0.8 wt. %, 0.2 wt. % to 0.6 wt. %, 0.2 wt. % to 0.4 wt. %, 0.4 wt. % to 1 wt. %, 0.4 wt. % to 0.8 wt. %, 0.4 wt. % to 0.6 wt. %, 0.6 wt. % to 1 wt. %, 0.6 wt. % to 0.8 wt. %, or 0.8 wt. % to 1 wt. % of pH adjusters.

In embodiments, the water-based drilling fluid system that includes the synthesized lubricant may have a pH of from 7 to 12, from 7 to 10.5, from 7 to 10, from 9 to 12, from 9 to 10.5, from 9 to 10, from 9.5 to 12, from 9.5 to 10.5, from 9.5 to 10, from 7.5 to 9, from 7.5 to 9.5, or from 10 to 12. In some embodiments, the water-based drilling fluid system that includes the synthesized lubricant may have a pH of from 9 to 10.5.

In some embodiments, the water-based drilling fluid system that includes the synthesized lubricant may include a weighting material. In some embodiments, the weighting material may be a particulate solid having a specific gravity (SG) sufficient to increase the density of the drilling fluid composition by a certain amount without adding excessive weighting material such that the drilling fluid composition cannot be circulated through the wellbore. The weighting material may have a specific gravity (SG) of from 2 to 6. Weighting materials include, but are not limited to, barite (minimum SG of 4.20), hematite (minimum SG of 5.05), calcium carbonate (minimum SG of 2.7 to 2.8), siderite (minimum SG of 3.8), ilmenite (minimum SG of 4.6), other weighting materials, or any combination of these weighting materials. Embodiments of the water-based drilling fluid system that include the synthesized lubricant may include an amount of weighting material sufficient to increase the density of the drilling fluid system to allow the drilling fluid system to support the wellbore and prevent fluids in downhole formations from flowing into the wellbore. The amount of weighting agent present in the water-based drilling fluid system depends on the required density of the system. The higher the required density of the water-based drilling fluid system, the higher the amount of weighting agent in the system. In other embodiments, the water-based drilling fluid system may include 1 wt. % to 50 wt. %, 1 wt. % to 40 wt. %, 1 wt. % to 30 wt. %, 1 wt. % to 20 wt. %, 1 wt. % to 10 wt. %, 1 wt. % to 5 wt. %, 5 wt. % to 50 wt. %, 5 wt. % to 40 wt. %, 5 wt. % to 30 wt. %, 5 wt. % to 20 wt. %, 5 wt. % to 10 wt. %, 10 wt. % to 50 wt. %, 10 wt. % to 40 wt. %, 10 wt. % to 30 wt. %, 10 wt. % to 20 wt. %, 20 wt. % to 50 wt. %, 20 wt. % to 40 wt. %, 20 wt. % to 30 wt. %, 30 wt. % to 50 wt. %, 30 wt. % to 40 wt. %, or 40 wt. % to 50 wt. % of weighting agents. In some embodiments, the density of the drilling fluid system may be 65 pounds per cubic feet (pcf) to 160 pcf or from 70 pcf to 90 pcf.

The synthesized lubricant included in embodiments of the water-based drilling fluid systems may increase the lubricity of the water-based drilling fluid system and decreases friction between the drill string and the wellbore during drilling operations. A reduction in the coefficient of friction of the water-based drilling fluid system containing the synthesized lubricant provides a reduction in friction experienced between the drill string and the wellbore. The coefficient of friction may be measured in accordance with a standard lubricity coefficient test. Specifically, a lubricity testing device as commonly used by those in the drilling fluid industry (OFI Testing Equipment, Inc. (OFITE), Houston, Tex.) may be utilized. In some embodiments, the water-based drilling fluid system has a before hot rolled (BHR) coefficient of friction of from about 0.01 to about 0.10 when measured according to API Recommended Practice 13B. In other embodiments, the drilling fluid system has a BHR coefficient of friction of from about 0.01 to about 0.1, from about 0.01 to about 0.08, from about 0.02 to about 0.1, from about 0.02 to about 0.08, from about 0.03 to about 0.1, from about 0.03 to about 0.08, from about 0.01 to about 0.05, from about 0.01 to about 0.04, from about 0.01 to about 0.03, or about 0.025 to about 0.035, or about 0.03. In some embodiments, the water-based drilling fluid system has an after hot rolled (AHR) coefficient of friction of from about 0.01 to about 0.10 when measured according to API Recommended Practice 13B. In other embodiments, the drilling fluid system has a AHR coefficient of friction of from about 0.01 to about 0.1, from about 0.01 to about 0.08, from about 0.02 to about 0.1, from about 0.02 to about 0.08, from about 0.03 to about 0.1, from about 0.03 to about 0.08, from about 0.01 to about 0.05, from about 0.01 to about 0.04, from about 0.01 to about 0.03, or about 0.025 to about 0.035, or about 0.03.

In some embodiments, the water-based drilling fluid system is a homogenous mixture. In such embodiments, a homogeneous mixture means that the plant-based alkyl ester and the plant-based free fatty acid are mixed so that the water-based drilling fluid system is free of solids. As known in the art, solids may form in water-based drilling fluid systems upon adding liquid fatty acid to a base drilling fluid. The formation of these solids may be attributed to the inability of fatty acid to uniformly distribute in the drilling fluid system, causing a non-homogeneous drilling fluid system. The formation of solids in the drilling fluid system alters the homogeneity of the drilling fluid system, and homogeneity is a primary requirement of a drilling fluid system. Therefore, if the drilling fluid system contains these solids, it is not an acceptable form of a drilling fluid system.

The water-based drilling fluid systems that include the synthesized lubricant may be well-suited for use in drilling operations. In embodiments, the water-based drilling fluid systems that include the synthesized lubricant provide lubrication functionality for cooling and lubricating the bit and drill string in boring operations. The synthesized lubricant imparts enhanced lubricity to the water-based drilling fluid system thereby providing increased lubrication and reduced friction between the drill string, pipe, and wellbore during drilling operations. The method for drilling in a well comprises operating a drill in a wellbore in the presence of the water-based drilling fluid system that includes the synthesized lubricant.

Test Methods

Viscosity

The viscosity of the water-based drilling fluid systems may be measured using a standard oilfield viscometer, such as an OFITE Model 900 viscometer manufactured by OFI Testing Equipment, Inc., according to test methods provided in the API Recommended Practice For Cementing (RP 10B) published in March 2008 and last reviewed and confirmed in 2017. The viscosity may be reported as shear stress in units of pounds of force per 100 square feet (lbf/100 ft$^2$). The viscometer may also be used to measure the shear rate of the water-based drilling fluid systems. The viscosities may be measured at the shear rates of 600 rotations per minute (rpm), 300 rpm, 200 rpm, 100 rpm, 6 rpm, and 3 rpm, both before hot rolling (BHR) and after hot rolling (AHR). The hot rolling may be performed at 212° F. (100° C.) to 250° F. (121° C.) and 500 psi for 16 hours in aging cells.

Gel Strength

The gel strength refers to the shear stress of the water-based drilling fluid system measured at a reduced shear rate following a defined period of time during which the water-based drilling fluid system is maintained in a static state. The shear stress of the composition at reduced shear rate may be measured using a standard oilfield viscometer, such as an OFITE Model 900 viscometer manufactured by OFI Testing Equipment, Inc., operated at reduced rpms, such as at 3 rpm, according to the test methods described in API Recommended Practice On Determining the Static Gel Strength of Cement Formulations (RP 10B-6/ISO 10426-6:2008) published in March 2008 and last reviewed and confirmed in 2017. To measure the gel strength, the water-based drilling fluid system is first stirred by contacting the composition with the spindle of the viscometer and operating the viscometer at 600 rotations per minute (rpm). The viscometer is then turned off for period of time (time period). For a 10-second gel strength, the time period is 10 seconds, and for a 10-minute gel strength, the time period is 10 minutes. It should be understood that other time periods for measuring gel strength may be used as reference times for measurements of gel strength. During the time period, the composition comes to rest in a static state. Upon expiration of the time period, the viscometer is turned back on at a reduced speed, such as 3 rpm to generate a reduced shear rate. The viscometer reading is then taken. The gel strength of the water-based drilling fluid system is reported in units of pounds of force per 100 square feet (lbf/100 ft$^2$).

Rheology

The rheology of the water-based drilling fluid systems may be modeled based on Bingham plastic flow behavior. In particular, the water-based drilling fluid systems may behave as a rigid body at lesser shear stress but flow as a viscous fluid at greater shear stress. The rheological behavior of the water-based drilling fluid systems may be determined by measuring the shear stress on the composition at different shear rates, which may be accomplished by measuring the shear stress, the shear rate, or both on the composition using a FANN® Model 35 viscometer operated at 3 rpm, 6 rpm, 100 rpm, 200 rpm, 300 rpm, or 600 rpm. The rheology of the water-based drilling fluid systems may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids in the water-based drilling fluid systems, such as weighting materials. A lesser PV is preferred. The PV of the water-based drilling fluid systems may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 3 (EQU. 3), which is subsequently provided. The PV values determined for the water-based drilling fluid systems are provided in this disclosure in units of centipoise (cP).

$$PV=(\text{viscosity at 600 rpm})-(\text{viscosity at 300 rpm}) \qquad \text{EQU. 3}$$

At shear stress less than the YP of the water-based drilling fluid system, the water-based drilling fluid system behaves as a rigid body, and at shear stress greater than the YP of the water-based drilling fluid system, the water-based drilling fluid system flows as a viscous fluid. In other words, the YP represents the amount of stress required to move a fluid from a static condition. The YP is determined by extrapolating the Bingham plastic rheology model to a shear rate of zero. The YP of the water-based drilling fluid system may be estimated from the PV from EQU. 3 by subtracting the PV from the shear stress measured at 300 rpm according to Equation 4 (EQU. 4), which is provided subsequently.

$$YP=(300 \text{ rpm reading})-PV \qquad \text{EQU. 4}$$

The YP is expressed as a force per area, such as pounds of force per one hundred square feet (lbf/100 ft$^2$). The methods for measuring and determining PV and YP for the water-based drilling fluid systems are consistent with methods conventionally used for drilling fluids in general.

API Spurt Loss Test

Spurt loss is a measurement of the instantaneous volume—or "spurt"—of liquid that passes through a filter medium prior to deposition of a competent and controlling filter cake. A "competent" filter cake is one that maintains its original thickness during deformation. The spurt loss of the water-based drilling fluid systems may be measured according to test methods provided in the API Recommended Practice for Cementing (RP 10B) published in March 2008 and last reviewed and confirmed in 2017.

API Fluid Loss Test

API fluid loss is a measurement of the static filtration behavior of the water-based drilling fluid system at ambient temperature and 100-psi differential pressure. The fluid loss of the water-based drilling fluid systems may be measured according to test methods provided in the API Recommended Practice for Cementing (RP 10B) published in March 2008 and last reviewed and confirmed in 2017.

API Filter Cake Thickness

Filter cake thickness is a measurement of the thickness of the filter cake. The filter cake thickness of the water-based drilling fluid systems may be measured according to test methods provided in the API Recommended Practice for Cementing (RP 10B) published in March 2008 and last reviewed and confirmed in 2017.

EXAMPLES

The following examples illustrate one or more additional features of the present disclosure. It should be understood that these examples are not intended to limit the scope of the disclosure or the appended claims in any manner.

To compare the lubricating effect of the synthesized lubricant, five KC1 polymer water-based drilling fluid systems were prepared. The first drilling fluid system, Comparative Example A, is a drilling fluid with no added lubricant. The second drilling fluid system, Comparative Example B, is a drilling fluid system with 2% ester of waste vegetable oil. The third drilling fluid system, Example C, is a drilling fluid system with 1% fatty acid. The fourth drilling fluid system, Example D, is a drilling fluid system with the disclosed synthesized lubricant. Finally, the fifth drilling fluid system, Example E, is a drilling fluid system with a comparative lubricant. Each example's formulation is provided in Table 1 and described in the following corresponding paragraphs.

TABLE 1

Formulations of Water-Based Drilling Fluid Examples.

| Component | Comparative Example A | Comparative Example B | Comparative Example C | Example D | Comparative Example E |
|---|---|---|---|---|---|
| Lubricant (mL) | 0 | Comparative Lubricant 7 | Comparative Lubricant 3.5 | Disclosed Lubricant 10.5 | Comparative Lubricant 10.5 |
| Water (mL) | 332 | 332 | 332 | 332 | 332 |
| Soda Ash (g) | 0.25 | 0.25 | 0.25 | 0.25 | 0.25 |
| Bentonite (g) | 5 | 5 | 5 | 5 | 5 |
| Polyanionic Cellulose (g) | 3 | 3 | 3 | 3 | 3 |
| XC Polymer (g) | 1 | 1 | 1 | 1 | 1 |
| KCl (g) | 20 | 20 | 20 | 20 | 20 |
| pH | 9.5 | 9.5 | 9.5 | 9.5 | 9.5 |

Comparative Example A

As shown in Table 1 and stated previously, the formulation of Comparative Example A includes no added lubricant. This drilling fluid system was prepared by combining 332 mL of water, 0.25 g of soda ash, 5 g of bentonite, 3 g of polyanionic cellulose (commercially available as PAC-R from Halliburton), 1 gram of XC Polymer, and 20 g of KCl.

Comparative Example B

As shown in Table 1 and stated previously, the formulation of Comparative Example B includes 2% fatty ester derived from a waste vegetable oil. This drilling fluid system was prepared by combining 332 mL of water, 0.25 g of soda ash, 5 g of bentonite, 3 g of polyanionic cellulose, 1 gram of XC Polymer, 20 g of KCl, and 7 mL of a methyl ester derived from a waste vegetable oil.

To prepare the methyl ester, the source of waste vegetable used was used vegetable and cooking oil from restaurants. The waste vegetable oil was a mixture of used vegetable oils, which included, but was not limited to, corn oil, sunflower oil, palm oil, canola oil, and peanut oil.

The food and other contents present in the waste vegetable oil were then filtered off to remove the impurities from the raw material waste oil and produce a filtered raw material oil. To perform this filtering off step, a low pressure filtration cell was used to remove impurities including burnt and unburned food residue, which were present in the waste vegetable oil. The low pressure filtration cell included size 5 μm filter paper or less to remove impurities that were larger than 5 μm. A constant pressure between about 5 and about 10 psi was maintained on the low pressure cell for the quick filtration of a volume of the waste vegetable oil.

Then, the raw material waste oil was esterfied to produce alkyl ester products and triglycerides. The esterification step was performed by mixing about 4.22 g NaOH per liter of waste vegetable oil under dry conditions using a magnetic stirrer and added to the raw material oil in a container. The mixture was then stirred for six hours using the magnetic stirrer to complete the interactions. The total reaction product was then left under static conditions overnight to complete the sedimentation of glycerol and sludge at the bottom of the container. During the initial settling phase, if some emulsion formed because of the presence of emulsion-forming byproducts in the ester layer, the container was heated to break up at about 80° C. or by adding about 10 mL of acetic acid per liter of raw material oil to break and prevent the emulsion formation.

Next, the alkyl ester products and triglycerides, which were produced during the esterification step, were separated. To separate these products, after complete sedimentation, the top clear esterified oil was decanted slowly and washed for several hours using water while stirring with a magnetic stirrer. Then, the esterified oil and the washed water where left under static conditions overnight to allow for the effective separation of the oil and water phases. The separated oil phase was decanted slowly to remove it from the water phase. This process of washing was then repeated three times.

Finally, the alkyl ester products were dried. After the final washing, the washed, esterified oil was heated to 80° C. under dynamic conditions for 12 hours using a hot plate and a magnetic stirrer to remove water and methanol further from the alkyl ester products, producing the methyl ester.

Comparative Example C

As shown in Table 1 and stated previously, the formulation of Comparative Example C includes 1% plant-based fatty acid. This drilling fluid system was prepared by combining 332 mL of water, 0.25 g of soda ash, 5 g of bentonite, 3 g of polyanionic cellulose, 1 gram of XC Polymer, 20 g of KCl, and 3.5 mL of the commercially-available plant-based fatty acid, Sylfat FA1 by Kraton Corporation.

Example D

As shown in Table 1 and stated previously, the formulation of Example D includes the disclosed synthesized lubricant. This drilling fluid system was prepared by combining 332 mL of water, 0.25 g of soda ash, 5 g of bentonite, 3 g of polyanionic cellulose, 1 gram of XC Polymer, 20 g of KCl, and 10.5 mL of the synthesized lubricant. The synthesized lubricant was prepared according to the method in the following paragraphs.

To prepare the synthesized lubricant, first, a methyl ester was prepared according to the methods described previously in Example B. The source of free fatty acid was a tall oil fatty acid made up of mainly linoleic acid with a chain length of $C_{18}$ and high unsaturation. Here, the tall oil was SYLFAT FA1 Tall Oil Fatty Acid from Kraton Corporation. To produce the synthesized lubricant the methyl ester and the free fatty acid were mixed in a volumetric ratio of 7.5 milliliters to 3.5 milliliters (which could also be expressed as a 2:1 ratio by barrel of mud). The methyl ester and the free fatty acid were mixed at a rate of about 200 to 300 rpm and a temperature of 50° C. using a hot plate to create a homogeneous blend. Then, 10.5 mL of the synthesized lubricant was mixed with the rest of the components to produce the water-based drilling fluid system according to the formulation in Table 1.

Comparative Example E

To compare the rheological properties of drilling fluids containing the synthesized lubricant, a conventional, commercial lubricant was used (the "comparative lubricant"). As shown in Table 1 and stated previously, the formulation of Comparative Example E includes 3% comparative lubricant. This drilling fluid system was prepared by combining 332 mL of water, 0.25 g of soda ash, 5 g of bentonite, 3 g of polyanionic cellulose, 1 gram of XC Polymer, 20 g of KCl, and 10.5 mL of comparative lubricant. The comparative lubricant used here was Radiagreen EME Salt provided by Bri-Chem Supply, Ltd.

Comparison of Water-Based Drilling Fluid Examples

Each example was tested for spurt loss, fluid loss, filter cake thickness, BHR and AHR according to the disclosed test methods. The co-efficient of friction (COF) values, in terms of BHR and AHR for each of the 5 drilling fluid systems were measured using an Ofite lubricity meter and using deionized water as a standard. The viscosities were measured at the shear rates of 600 rpm, 300 rpm, 200 rpm, 100 rpm, 6 rpm, and 3 rpm, both before hot rolling (BHR) and after hot rolling (AHR). The hot rolling was performed 250° F. (121° C.) and 500 psi for 16 hours in aging cells. The measured COF values are provided in Table 2. These values were used to compare the effect of the synthesized and comparative lubricants. The results of each of these tests for the five examples are provided in Table 2.

TABLE 2

Comparison of Spurt Loss, Fluid Loss, Filter Cake Thickness, and Coefficient of Friction Values of Examples A-E.

| Test | Comparative Example A | Comparative Example B | Comparative Example C | Example D | Comparative Example E |
|---|---|---|---|---|---|
| API Spurt Loss (cc) | 0.5 | 0.6 | 0.3 | 0.7 | 1 |
| API Fluid Loss (cc) | 9 | 8.5 | 7.5 | 6.9 | 5.9 |
| API Filter Cake Thickness (mm) | 1.191 | 1.191 | 1.191 | 1.191 | 1.191 |
| BHR | 0.31 | 0.28 | 0.03 | 0.03 | 0.11 |
| AHR | 0.30 | 0.17 | 0.02 | 0.031 | 0.09 |

As shown by the results provided in Table 2, Comparative Examples A, B, and E and Example D have comparable values for spurt loss, fluid loss, or filter cake thickness. Also, the results presented in Table 2 show that the co-efficient of friction (COF) for the drilling fluid without lubricant, Comparative Example A, was measured at 0.30. Comparative Example A was used to gauge the lubricating effects of each lubricant. First, Comparative Example B having 2% ester of waste vegetable oil as lubricant showed little effect in improving the lubricity of the base drilling fluid (Comparative Example A). Increasing the lubricant volume to 3% has no effect in improving the lubricity. This is evident because the BHR and AHR for Comparative Example B were 0.28 and 0.17, respectively, compared to 0.31 and 0.30 for Comparative Example A.

Second, for Comparative Example C where 1% fatty acid was used as the lubricant, the results appeared to show that this lubricant may be effective in improving the lubricity and reducing the BHR and AHR of Example A at 0.31 and 0.3, respectively, to 0.03 and 0.02 (Comparative Example C). However, there appear to be other issues with choosing the lubricant used in Comparative Example C. Upon adding the liquid fatty acid to the base drilling fluid formulation, white solids formed in the drilling fluid system. This is because for Comparative Example C, increasing the lubricant loading from 1% to 3% resulted in more solids formation. This observation may be attributed to the inability of the fatty acid of Comparative Example C to uniformly distribute in the drilling fluid system, causing a non-homogeneous drilling fluid system. The formation of solids in the drilling fluid system alters the homogeneity of the drilling fluid system, which is a primary requirement of a drilling fluid. It is important that any additive that may be added to a drilling fluid does not alter the basic drilling fluid properties and qualities, such as rheology, homogeneity, and filtration control properties. Therefore, Comparative Example C, which generated white solids floating on the surface of the drilling fluid system, is not an acceptable form of a drilling fluid system.

Third, Example D, showed improved lubricating effect with a BHR and AHR of 0.03 and 0.031, respectively, while maintaining or retaining homogeneity of the control fluid. These results show that the disclosed synthesized lubricant has a direct impact on reducing the friction by approximately 10 times as compared to the drilling fluid without lubricant (Comparative Example A). Moreover, Example D has no negative impact on the quality of the drilling fluid because no solids formed to create a non-homogeneous system. Therefore, it is clear that the alkyl ester derived from waste vegetable oil has a role in dispersing the plant-based free fatty acids throughout the drilling fluid system, which results in a homogeneous water-based drilling fluid system.

Finally, Comparative Example E, which includes the comparative lubricant, showed BHR and AHR measurements of 0.11 and 0.09, which is well below the values of Example D, 0.03 and 0.031, respectively. Therefore, it is clear from these results that Example D, which includes the synthesized lubricant, shows improved results over the comparative lubricant in water-based drilling fluid systems.

Additionally, each example was tested for its rheological properties according to the disclosed test methods. The results of each of these tests for the five examples are provided in Table 3. Comparative Example C was unable to be tested for its rheological properties because the drilling fluid was non-homogenous. This non-homogeneity in Comparative Example C was caused by the fatty acid in the formulation.

TABLE 3

Comparison of Rheological Properties.

| Component | Comparative Example A | | Comparative Example B | | Comparative Example C | | Example D | | Comparative Example E | |
|---|---|---|---|---|---|---|---|---|---|---|
| | BHR | AHR | BHR | AHR | BHR | AHR | BHR | AHR | BHR | AHR |
| 600 RPM | 45.3 | 38.3 | 38.7 | 36.7 | Not measured | | 41.6 | 38.1 | 51.9 | 44.1 |
| 300 RPM | 32.9 | 28.3 | 29.2 | 29.5 | | | 30.3 | 28.2 | 36.5 | 34.6 |
| 200 RPM | 27.6 | 23.8 | 25 | 25.4 | | | 26.1 | 23.8 | 29.9 | 29.1 |
| 100 RPM | 20.2 | 17.2 | 18.7 | 19.2 | | | 19.5 | 23.8 | 29.9 | 29.1 |
| 6 RPM | 6.7 | 5.9 | 8.1 | 9.1 | | | 8.3 | 7 | 8.4 | 10.5 |
| 3 RPM | 5.7 | 4.9 | 7.2 | 9 | | | 7.2 | 6.3 | 7.2 | 9.3 |
| 10 sec Gel (/bs/100 ft$^2$) | 6.7 | 6.3 | 9.9 | 7.8 | | | 7.7 | 6.9 | 9.5 | 8.7 |
| 10 mm Gel (/bs/100 ft$^2$) | 15 | 11.6 | 19.7 | 15.5 | | | 16.6 | 14.9 | 15.4 | 13.4 |
| PV (cp) | 12.1 | 10 | 8 | 9.4 | | | 11.6 | 9.5 | 12.7 | 11.6 |
| YP (lbs/100 ft$^2$) | 19.9 | 18.2 | 18.4 | 19.7 | | | 19.7 | 18.5 | 27.1 | 23.2 |

As shown in Table 3, the rheological properties of Comparative Examples A, B, and E and Example D were also comparable. These results explain that the lubricants in Comparative Examples B and E and Example D have similar impacts on the filtration control properties and rheology of the original drilling fluid formulation without lubricant (Comparative Example A).

Therefore, based on the results in Tables 2-3 and the discussion above, it is evident that the disclosed synthesized lubricant achieves the appropriate balance between improving the lubricity of the drilling fluid system by reducing coefficient of friction for the drilling fluid system and while still maintaining the homogeneity of the drilling fluid system.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

What is claimed is:

1. A water-based drilling fluid system comprising:
   a water-based drilling fluid; and
   from 0.5 wt. % to 5 wt. % of a synthesized lubricant, based on the total weight of the water-based drilling fluid, the synthesized lubricant comprising a homogeneous blend of a plant-based alkyl ester, and a plant-based free fatty acid comprising linoleic acid;
   wherein the ratio of plant-based alkyl ester to plant-based free fatty acids is from 8:4 to 7:3 by volume.

2. The water-based wellbore drilling fluid system of claim 1, wherein the plant-based alkyl ester is derived from a plant-based oil.

3. The water-based wellbore drilling fluid system of claim 2, wherein the plant-based alkyl ester is derived from a waste vegetable oil.

4. The water-based wellbore drilling fluid system of claim 1, wherein the plant-based alkyl ester is a methyl ester.

5. The water-based wellbore drilling fluid system of claim 1, wherein the plant-based free fatty acid is derived from a tall oil.

6. The water-based wellbore drilling fluid system of claim 1, wherein the drilling fluid system has a before hot rolled (BHR) coefficient of friction of from 0.01 to 0.10 when measured according to API Recommended Practice 13B.

7. The water-based wellbore drilling fluid system of claim 1, wherein the drilling fluid system has an after hot rolled (AHR) coefficient of friction of from 0.01 to 0.09 when measured according to API Recommended Practice 13B.

8. The water-based wellbore drilling fluid system of claim 1, wherein the water-based drilling fluid comprises a KCl-polymer base fluid.

9. A method of producing a water-based wellbore drilling fluid system, the method comprising:
- deriving a plant-based alkyl ester from a waste vegetable oil;
- mixing the plant-based alkyl ester and a plant-based free fatty acid to form a homogeneous blend and produce a synthesized lubricant, wherein the ratio of plant-based alkyl ester to plant-based free fatty acid from 8:4 to 7:3 by volume; and
- mixing the synthesized lubricant with a water-based drilling fluid to form the water-based wellbore drilling fluid system.

10. The method of claim 9, wherein mixing the plant-based alkyl ester and the plant-based free fatty acid to produce the synthesized lubricant is at low shear.

11. The method of claim 9, wherein mixing the plant-based alkyl ester and the plant-based free fatty acid to produce the synthesized lubricant is at a temperature from 40 degrees Celsius (° C.) to 60° C.

12. The method of claim 9, wherein the plant-based alkyl ester and the plant-based free fatty acid are mixed separately from the water-based drilling fluid to produce the synthesized lubricant.

13. The method of claim 9, further comprising deriving the plant-based alkyl ester from a waste vegetable oil by esterifying a raw material oil comprising fatty acids with a short chain alcohol in the presence of a catalyst.

* * * * *

UNITED STATES PATENT AND TRADEMARK OFFICE
CERTIFICATE OF CORRECTION

PATENT NO. : 11,124,687 B2
APPLICATION NO. : 16/037569
DATED : September 21, 2021
INVENTOR(S) : Md Amanullah, Jothibasu Ramasamy and Ali Radhwan It is certified that error appears in the above-identified patent and that said Letters Patent is hereby corrected as shown below:

On the Title Page

Column 2, item (56), other publications, cite no. 3, delete "fally" and insert --fatty--, therefor.

Column 2, item (56), other publications, cite no. 3, delete "transeterification" and insert --transesterification--, therefor.

Signed and Sealed this
Thirtieth Day of August, 2022

Katherine Kelly Vidal
*Director of the United States Patent and Trademark Office*